(12) United States Patent
Coogan et al.

(10) Patent No.: US 7,024,282 B2
(45) Date of Patent: Apr. 4, 2006

(54) MULTI-NODE UTILIZATION OF A SINGLE NETWORK VARIABLE INPUT FOR COMPUTATION OF A SINGLE CONTROL VARIABLE AT A SINK NODE

(75) Inventors: Jim Coogan, Des Plaines, IL (US); Theo Frutiger, Buffalo Grove, IL (US); Mark Gagner, West Chicago, IL (US); Margaret Ruane, Wheeling, IL (US); Brian Kreger, Libertyville, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 415 days.

(21) Appl. No.: 10/259,995

(22) Filed: Sep. 26, 2002

(65) Prior Publication Data

US 2004/0064216 A1 Apr. 1, 2004

(51) Int. Cl.
*G05B 19/00* (2006.01)

(52) U.S. Cl. .................. 700/276; 700/90; 700/277

(58) Field of Classification Search .............. 700/29, 700/90, 95, 276, 277
See application file for complete search history.

(56) References Cited

U.S. PATENT DOCUMENTS

| | | | | |
|---|---|---|---|---|
| 4,926,375 A | * | 5/1990 | Mercer et al. | 709/201 |
| 5,513,324 A | | 4/1996 | Dolin, Jr. et al. | 370/466 |
| 6,128,315 A | | 10/2000 | Takeuchi | 709/237 |
| 2002/0152298 A1 | * | 10/2002 | Kikta et al. | 709/223 |

OTHER PUBLICATIONS

Neuron ® C Programmer's Guide Revision 4 (Echelon Corporation, Copyright 1990-1995 Echelon Corporation), Chapter 3 "How Nodes Communicate Using Network Variables," Document No. 29300.

* cited by examiner

*Primary Examiner*—Jayprakash N. Gandhi

(57) ABSTRACT

An environmental control system is configured to accept network variable outputs from a plurality of sources on a single network variable input and the update values are stored in a data structure for the computation of control variable values. The system includes a sink controller having a network variable input and a plurality of sources, each having at least one network variable output coupled to the network variable input of the sink controller. A data structure is provided so that update values from the sources may be stored in the structure with reference to the sources that provided the update values. Aggregate values, such as a mean average, minimum value, maximum value, standard deviation, variance, sum, or product may be computed from the values stored in the data structure.

25 Claims, 5 Drawing Sheets

MULTI-NODE UTILIZATION OF A SINGLE NETWORK VARIABLE INPUT FOR COMPUTATION OF A SINGLE CONTROL VARIABLE AT A SINK NODE

FIELD OF THE INVENTION

The present invention relates to distributed processing in automation control systems, and in particular, to automation control systems that use network variables to facilitate distributed processing.

BACKGROUND OF THE INVENTION

Automation control systems are well-known. Such systems include building automation systems for controlling environmental systems, elevator banks, and the like. Other automation control systems include industrial control, food processing, and transportation systems. These systems receive data from sensors that are evaluated to determine control actions to take in order to bring about some condition or perform some operation. For example, an environmental control system uses sensors to detect environmental conditions and system parameters throughout a building or other space that is environmentally regulated to determine control actions for maintaining or bringing the regulated space to some defined condition. Typically, the sensors are temperature sensors, infrared body detectors, position indicators, water flow meters, air flow meters, water pressure meters, air pressure meters, and the like. Position indicators are devices that generate a signal that corresponds to the position of a switch, valve, or vent opening so the system controller may determine whether particular lights, fans, vents, or blower motors are operating or open. The data that are generated by the sensors are provided to one or more controllers in the control system. The controllers typically compute control variables from the data, compare the computed or raw data to set points and then perform control actions to bring the sensed parameters into compliance with the conditions corresponding to the set points. For example, a control variable that indicates a person's entry into a room may be used to initiate control actions to achieve lighting, ventilation, and thermal comfort conditions specified for an occupied space. Such control actions may include the activation of blower motors to bring conditioned air into the room through vents that are also opened in response to control signals generated by the controller. In this manner, the controller may regulate the environmental conditions in a space.

Distributed processing may be used in an environmental control system to coordinate control of the system with the various HVAC functions in the system. For example, an air-handling unit (AHU) in an HVAC system distributes conditioned air to several variable air volume (VAV) terminals in a building. Thus, VAV controllers exchange data with the AHU controller so the AHU appropriately provides conditioned air to the VAVs and the AHU controller may synchronize the operation of these local space controllers.

One type of limitation typically encountered in distributed processing systems used for distributed control of an environmental space is the number of outputs from local space controllers that may be coupled to a synchronizing controller. For example, one known controller for environmental control systems is the NEURON CHIP controller available from Echelon of Palo Alto, Calif. The NEURON CHIP controller is used in a variety of controllers for environmental control systems that use distributed processing. When a NEURON CHIP controller is used to run an application program, the number of supported network variables is limited to sixty-two. Network variables are extremely useful because they may be used to make local data at one controller node available to external processes at another controller node. Thus, they may be used to provide data from one controller to another controller. NEURON CHIP controllers may also be used in other automation control systems such as building automation systems, industrial control systems, and transportation control systems.

In one type of distributed control system, network variables have been used so multiple local space controllers, such as VAV controllers, may share a single connection to a synchronizing controller, such as an AHU controller. In such a known arrangement, the local space controllers are called source controllers because they provide data to a sink controller, which may be an AHU controller. To provide data to a sink controller, a plurality of source controller network variable outputs may be coupled to one sink controller input through a single network variable input. To obtain data from the various source controller outputs coupled to the sink controller input, the sink controller may poll for data. Polling requires the sink controller to identify the source controller being polled in the polling message so the data received in response to the polling message may be associated with the source controller that generated the data. However, polling requires processing overhead for the sink controller that initiates the request for data and every source controller that determines whether it should respond with data to the polling message. Additionally, a polling technique does not permit the source controllers to provide data as it becomes available but rather a source controller must wait for a polling message before apprising the sink controller of conditions at the source controller.

In another distributed processing system, a plurality of source controller network variable outputs are associated with one network variable input of a sink controller without requiring the sink controller to poll the source controllers. In this arrangement, the sink controller may obtain data from a source controller as it is sent to update the shared network variable input along with the address of the source controller that provided the update data. In previously known systems, the sink controller read the data at its network variable input and invoked a task to process the data. When the next update on the shared network variable input occurred, the newly received data would overwrite the previously received data and the same task would execute to process the newly received data. Thus, the task at the sink controller for the shared network variable input only processed the data received at the shared network variable input of a sink controller without reference to the source controller that provided the data.

One limitation of this non-polled configuration of multiple source controllers updating a single network variable at a sink controller is the ability to persistently distinguish the data from the various data sources after it has been processed. Consequently, this configuration of multiple source controllers updating a single network variable at a sink controller is typically used only for tasks that do not require reference to data from other controllers that update the same network variable. For example, some control actions of a sink controller require comparison of an average, minimum, or maximum value to some threshold before a determination may be made to perform a control action. Because the network variable input coupled to the plurality of source controller network variable outputs only contains the most recent update data, a value for a control variable that requires data from other source controllers that also update the shared network variable input cannot be computed.

What is needed is a way of computing values for control variables that represent the values of a whole set of source controllers, all of which update one, shared network variable input at a sink controller.

SUMMARY OF THE INVENTION

A system made in accordance with the principles of the present invention overcomes limitations previously encountered with the configuring of multiple source controllers to update a single network variable input at a sink controller. The system of the present invention includes a sink controller having a network variable input, a plurality of source controllers, at least two of which have a network variable output coupled to the network variable input of the sink controller to provide an update value to the network variable input, and a data structure in the sink controller for storing update values received from the network variable outputs of the source controllers that are coupled to the network variable input. Thus, the latest update value received from each source controller is persistently stored in the sink controller with reference to the source controller that provided the update value. The system may further comprise a function that operates on the stored update values to generate an aggregate or selection value for a control variable from the update values stored in the data structure. The function may be a minimum function, maximum function, sum function, product function, standard deviation function, variance function, or an average calculating function, for example. The minimum function identifies the numerically smallest data value of the update values stored in the data structure while the maximum function identifies the numerically largest data value of the update values stored in the structure. The sum function may generate the sum of all values stored in the structure. The product function may generate the product of all values in the structure. The standard deviation function may generate the standard deviation of all values stored in the structure. The variance function may determine the variance of all values stored in the structure. The average calculating function may generate the mean average value or the median average value of the update values stored in the structure.

The data structure of the present invention may be a table that includes an entry for each source controller output address that provides update values to the network variable input of the sink controller. The source controller address may be obtained when the network variable input of the sink controller receives update data. Thus, the sink controller may read the address of the source controller providing the latest update value to the network variable input in conjunction with its reading of the update value for the network variable input. The sink controller may use the source controller address as a reference to a corresponding location in the data structure where the update variable may be stored. Thus, a table of update values for each source controller may be kept in the sink controller's memory. The update value read from the network variable input is used to overwrite the previously stored value from the same source controller. In this manner, the data structure contains a current set of source controller update values. A function that operates on the update values in the table may be executed to derive a value for a control variable from the current set of source controller readings. The data structure of the present invention may also be implemented with an array. In the array, each indexed location in the array may be used for storage of the last update value received from a source controller and the index to the location corresponds to one of the source controllers. The data structure of the present invention may also be implemented with linked lists, linked objects, a database, or any structure that stores a data value at a location corresponding to an identifier or reference for the source of the data.

In a preferred embodiment of the present invention, the function for deriving a value for a control variable from the update values stored in the data structure may be an aggregate function or a selection function. An aggregate function operates on values to generate a value representative of the data values of the group. For example, a mean average function, a standard deviation function, a variance function, a sum function, and a product function, may by considered aggregate functions. Selection functions, however, select one of the values from the group of data values. A maximum function, a minimum function, or a median average function, for example, may be considered as selection functions. The source controllers coupled to the network variable input of the sink controller, preferably, provide the same type of data. For example, real number data may represent temperature, pressure, flow rate, humidity, water content, damper position, or valve position data while discrete level data may be a boolean or an integer value that may represent a switch position, actuator status, device status, occupancy mode, or operating mode data. Thus, the present invention permits a sink controller to determine a minimum, maximum, mean, median, standard deviation, variance, sum and/or product value from data values corresponding to a space or to detect the positions or status of devices for controlling conditions for a space, respectively.

In an alternative embodiment of the present invention, the plurality of local space controllers may be coupled to one another so that one local space controller acts as a sink controller to another local space controller. In this embodiment, a function at the sink controller operates on the update value received from a local space controller acting as a source controller for the network variable output associated with the network variable input to which the source controller is coupled. The function may, for example, compute a sum from a local value at the sink controller and the update value received from the source controller. This sum value, to continue the example, may then be provided by the sink controller as a network variable output to another local space controller so that the first sink controller now acts as a source controller to another local space controller that is receiving the sum value as an update value. This coupling of one controller to another to propagate a sum value through a plurality of local space controllers may continue until the last local space controller in the plurality provides the sum value for the plurality to a synchronizing controller. Although this embodiment only uses one network variable input at the synchronizing controller, it has two limitations. For one, some delay may occur as the value from the function operating in each sink controller propagates through the controllers. For another, the function should be one that does not require identification of the source of an update value. For example, the minimum function in a sink controller may determine that the update value is less than a local value at the sink controller. The sink controller may provide this selected minimum value on its network variable output that is coupled to the next sink controller's network variable input. However, the network variable input address at the next sink controller is set to a value corresponding to the address of the source controller that executed the function and selected the minimum value and not the source controller that provided the minimum value.

An exemplary method for implementing the principles of the present invention includes coupling a plurality of source controller network variable outputs to a network variable input at a sink controller so each source controller may provide update values to its network variable output associated with the network variable input, and storing each update value for the network variable input in a data structure at the sink controller. The update value storage may also include identifying a storage location with reference to a source controller address. The source controller address is received in conjunction with an update value for the network variable input.

The method may also include operating on the stored update values to identify a minimum value or a maximum value from the update values. Alternatively, the method may include operating on the stored update values to compute a mean average or a median average from the stored update values. The method may also include updating the network variable input with real number or discrete level data. The real number data may include temperature, pressure, flow rate, humidity, water content, damper position, or valve position data. The discrete level data may include switch position, actuator status, device status, occupancy mode, or operating mode data. Device status data represent operating conditions of system components other than switches or actuators. Occupancy mode may indicate the presence of people in a space or the like while operating mode data indicates whether the system is heating or cooling, for example.

It is an object of the present invention to persistently store a set of update values from the source controllers coupled to a network variable input at a sink controller with reference to a source controller address that identifies the source controller providing the update value for each member of the set.

It is an object of the present invention to operate on the stored set of update values for a plurality of source controllers coupled to a single network variable input to determine a value for a control variable at a sink controller.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION OF THE INVENTION

Figure 1:
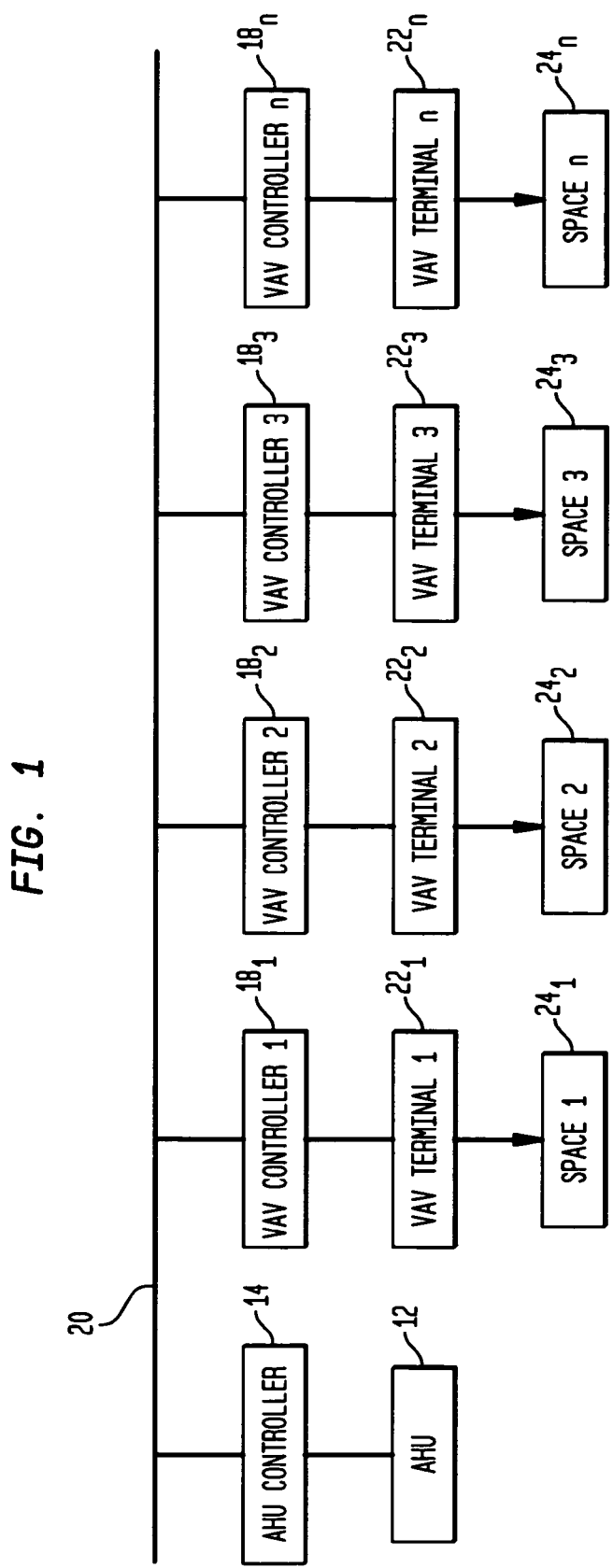
FIG. 1 shows a block diagram of an air distribution system in which the system and method of the present invention may be used.

FIG. 1 shows a typical air distribution system 10 in which an air-handling unit (AHU) controller 14 controls the operation of AHU 12. Controller 14 is coupled as a sink controller through a network 20 to a plurality of variable air volume (VAV) controllers $18_1 \ldots 18_n$ that operate VAV terminals $22_1 \ldots 22_n$ bringing conditioned air to local spaces $24_1 \ldots 24_n$. VAV controllers $18_1 \ldots 18_n$, AHU controller 14, and network 20 are, preferably, implemented using LONWorks technology. Consequently, AHU controller 14 and controllers $18_1 \ldots 18_n$ are controllers that contain a Neuron® micro-controller. These controllers may be a controller that has passed LonMark certification, which means at least a portion of the controller's network interface is standardized. The network interface includes network variable inputs, network variable outputs, and network configuration inputs. Network bus 20 is, preferably, a LonTalk network. Neuron, LonMark, and LonTalk are all trademarks of Echelon Corporation of Palo Alto, Calif. The LonTalk protocol is an open protocol that supports interoperability between controllers and other HVAC components that are not manufactured by the same source. As shown in FIG. 1, controllers $18_1 \ldots 18_n$ individually control environmental parameters of spaces $24_1 \ldots 24_n$, respectively, and they all are under the overall control of AHU 14. That is, each of the controllers is coupled to one or more sensors and/or actuators to control airflow and other environmental parameters in some space$_n$ so they correspond to set point conditions stored in a controller. Typically, AHU controller 14 communicates with controllers $18_1 \ldots 18_n$ over network 20 to synchronize their operation. In order to coordinate their operation, AHU controller 14 also requires status data from controllers $18_1 \ldots 18_n$ regarding their respective local spaces.

Figure 2:
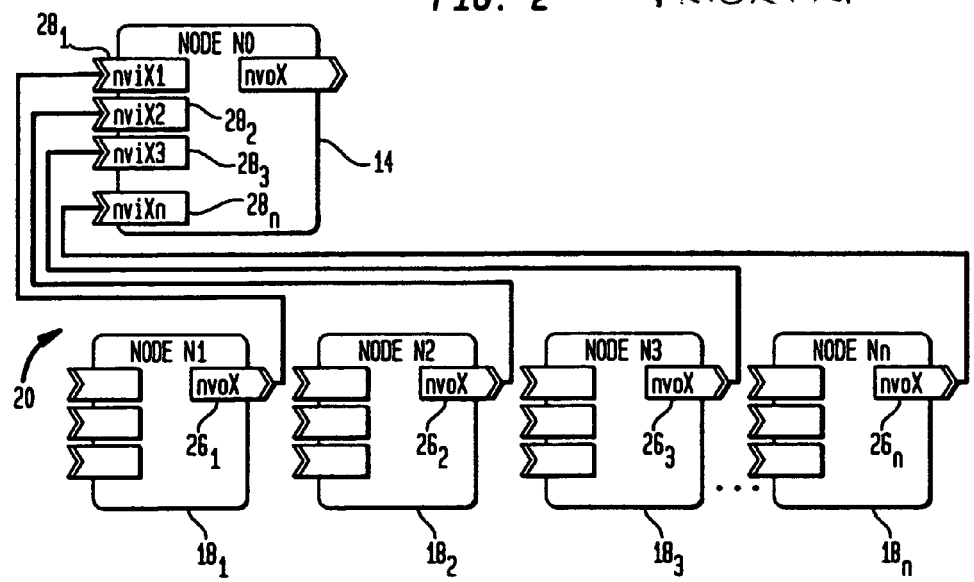
FIG. 2 shows a previously known coupling of variable air volume (VAV) controllers to an air-handling unit (AHU) controller for computation of aggregate value parameters.

FIG. 2 depicts a known method of coupling node controllers $18_1 \ldots 18_n$ to AHU controller 14 in a LONWorks environment. As is well known, data values may be exchanged between LONMark and LonWorks controllers by using network variables. To exchange data through a network variable, at least one controller, called a source controller, provides data to another controller, called a sink controller. The source controller sends the data out through a network variable output while the sink controller receives the data through a network variable input. When a sink controller receives data, an nv_update_occurs event is triggered at the sink controller. When the nv_update_occurs event is triggered, a variable at the sink controller, nv_in_addr, is assigned a value that corresponds to the network address for the source controller. Also at the triggering of the nv_update_occurs event, the network variable input coupled to the network variable outputs of the source controllers, is assigned a value corresponding to the update data sent by a source controller. In FIG. 2, network variable outputs $26_1 \ldots 26_n$ from the controllers $18_1 \ldots 18_n$ are coupled to separate network variable inputs $28_1 \ldots 28_n$ at controller 14. In this manner, controller 14 may receive update values for each network variable input and use those received values for an aggregate calculation, such as an average temperature or minimum/maximum (min/max) calculation.

While the known coupling arrangement of FIG. 2 may used to provide data from a VAV controller to an AHU controller, it suffers from the limitation that each network variable output of a source controller requires a separate network variable input of the sink controller. In LON Works controllers that use the NEURON CHIP controller to implement a application program, the number of network variables available is limited to sixty-two. This limitation may hinder the ability of an AHU controller to obtain all of the data required for synchronize the operation of controllers $18_1 \ldots 18_n$.

Figure 3:
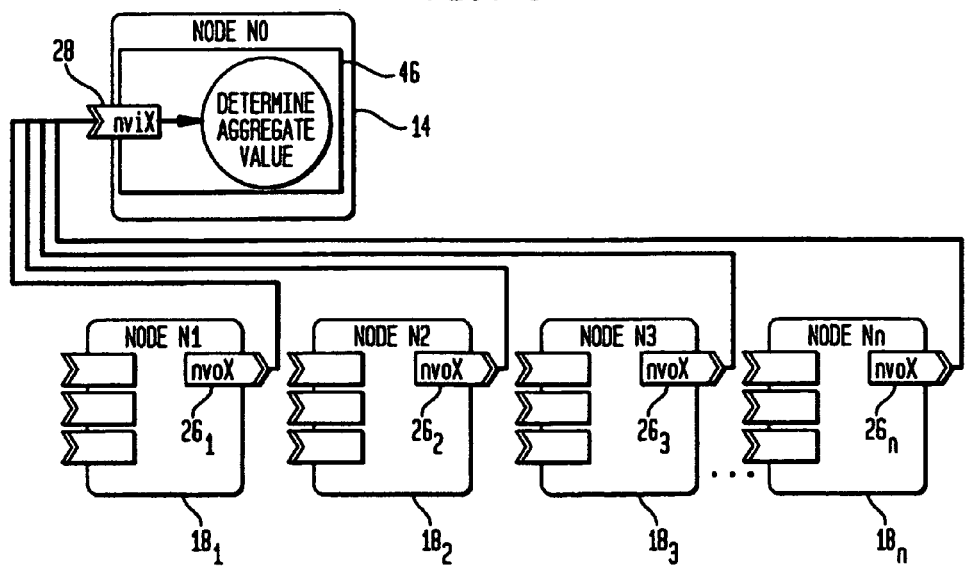
FIG. 3 shows a coupling of VAV controllers to an AHU controller done in accordance with the principles of the present invention.

To address this issue, controllers $18_1 \ldots 18_n$ may be coupled to AHU controller 14 as shown in FIG. 3. There, the network variable output of each source controller $18_1 \ldots 18_n$ is coupled to the same network variable input 28 of sink controller 14. The reader should appreciate that the terms "sink" and "source" refer to a relationship with respect to a particular network variable connection. Consequently, one of the controllers $18_1 \ldots 18_n$ may be a sink for controller 14 acting as a source by coupling a network variable input of one of the controllers $18_1 \ldots 18_n$ to a network variable output of controller 14. Likewise, one of the controllers $18_1 \ldots 18_n$ may be a sink for another of the controllers $18_1 \ldots 18_n$ by coupling a network variable output of one of the controllers $18_1 \ldots 18_n$ to a network variable input of another one of the controllers $18_1 \ldots 18_n$. However, with reference to the network variable input 28 of controller 14 as shown in FIG. 3, controller 14 is a sink for each of the network variable outputs $26_1 \ldots 26_n$ of controllers $18_1 \ldots 18_n$, which are acting as sources for input 28.

While the arrangement of FIG. 3 overcomes the limitation on the number of network variables at NEURON CHIP controller, it does not enable sink controller 14 to compute an aggregate value from the update values provided from controllers $18_1 \ldots 18_n$. With each nv_update_occurs event, one of the controllers $18_1 \ldots 18_n$ sends an update value with the source controller's network address to the network variable input 28 of controller 14. The program executing in controller 14 that controls its operation responds to an nv_update_occurs event by using the update value that has been assigned to the network variable input to perform some task. However, the task cannot be one that computes an aggregate value from update values from all of the source controllers because the update values previously received from the other source controllers coupled to the network variable input are no longer available. That is, only the update value from the source controller that has most recently sent data to the network variable input of the sink controller is available for processing.

Figure 4:
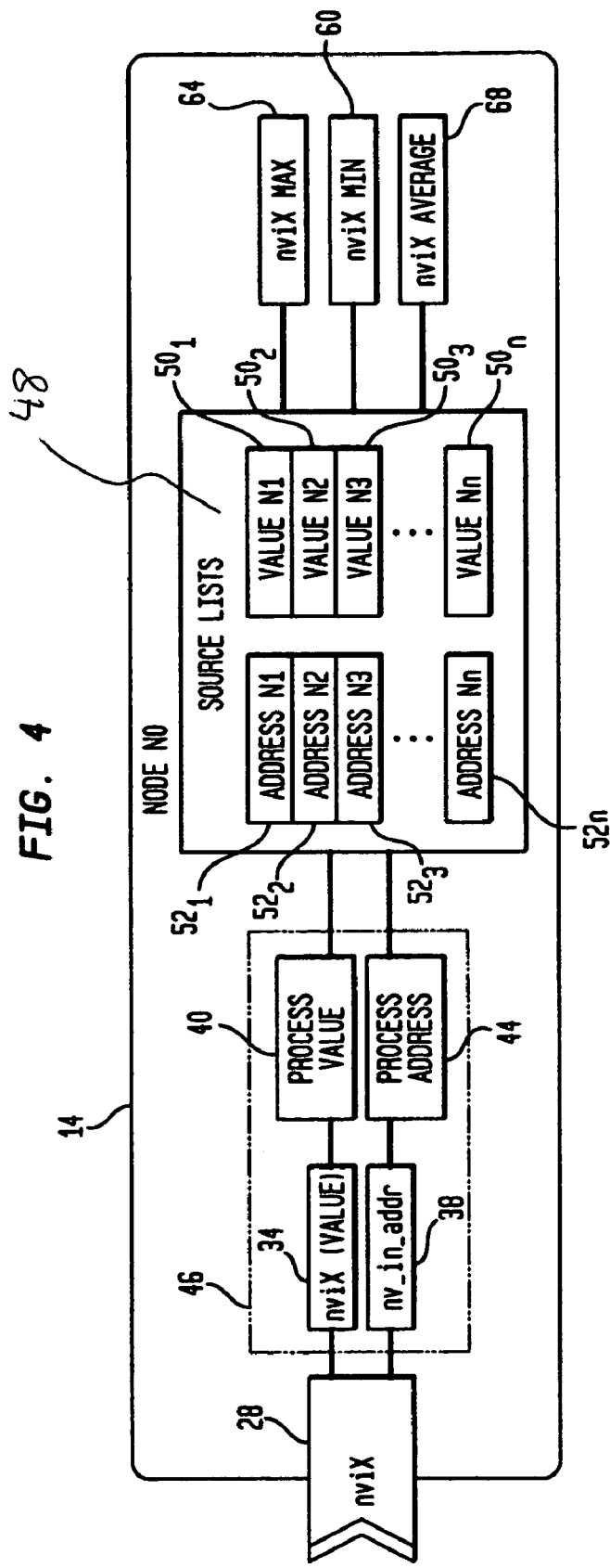
FIG. 4 illustrates persistent storage of update values received from the VAV controllers coupled to the AHU controller as shown in FIG. 3.

To address this need for previously received update values, a data structure may be provided for storing the previously received update values. An implementation of such a data structure with use of a table 48 is represented in FIG. 4. As shown there, the network variable input 28 provides an update value 34 and a source address 38. The update values may be real numbers or discrete level data, such as integers or boolean values. The real number data may be temperature, pressure, flow rate, humidity, water content, damper position, or valve position data. The discrete level data may indicate switch position, actuator status, device status, occupancy mode, or operating mode data. A function for processing data values 40 and a function for processing address data 44 execute in a task 46 of the program executing in sink controller 14. Source address 38 is the network address that identifies one of the controllers $18_1 \ldots 18_n$ that sent update value 34. Table 48 includes a list of network addresses $52_1 \ldots 52_n$ and a list of values $50_1 \ldots 50_n$. Task 46 uses the process address function 44 to evaluate the contents of source address 38 that identify the network address of the controller that sent the update value. Function 44 may update one of the network addresses in the list of network addresses $52_1 \ldots 52_n$ or generate a pointer or other reference to a storage location in the table for data. Task 46 uses the process value function 40 to evaluate the contents of value 34 that contains the update value sent by the controller and to update one of the values in the list of values $50_1 \ldots 50_n$. With this structure, a task 46 may store an update value in a location corresponding to the network address for the source controller that sent the update value. The task may also use the update values stored in table 48 to compute an aggregate parameter that may be used in synchronizing the operation of controllers $18_1 \ldots 18_n$. Thus, a task may determine which of the update values in locations $50_1 \ldots 50_n$ is a minimum 60 or maximum 64 so an appropriate control action may be taken in response to that determination. Likewise, a task may compute a mean average 68 or median average (not shown) from the values stored in the table.

Data structure 48 may also be an array with a fixed size, as opposed to a table, that can increase or decrease in size. As update values are received during nv_update_occurs events, the update values are stored in the array at the location corresponding to the source controller that sent the data. The data stored in the array may then be used to compute aggregate values as discussed above. Data structure 48 may also be a linked list, linked objects, or a database. The address data obtained by function 44 permits a linked list to be traversed so a corresponding value may be updated or a corresponding object selected so the appropriate value for the object is updated. For database operation, function 44 may identify an address that may be used as a key to retrieve a data record for updating purposes.

In order to provide further historical data for a task, a circular buffer may be associated with each reference for a network address coupled to a network variable. The circular buffer may be used to store the latest update value at a new storage location in the buffer until the buffer is full. Thereafter, subsequent update values may be used to overwrite the oldest update value in the buffer. Management of pointers for implementation of a circular buffer in this manner is well-known.

Figure 5:
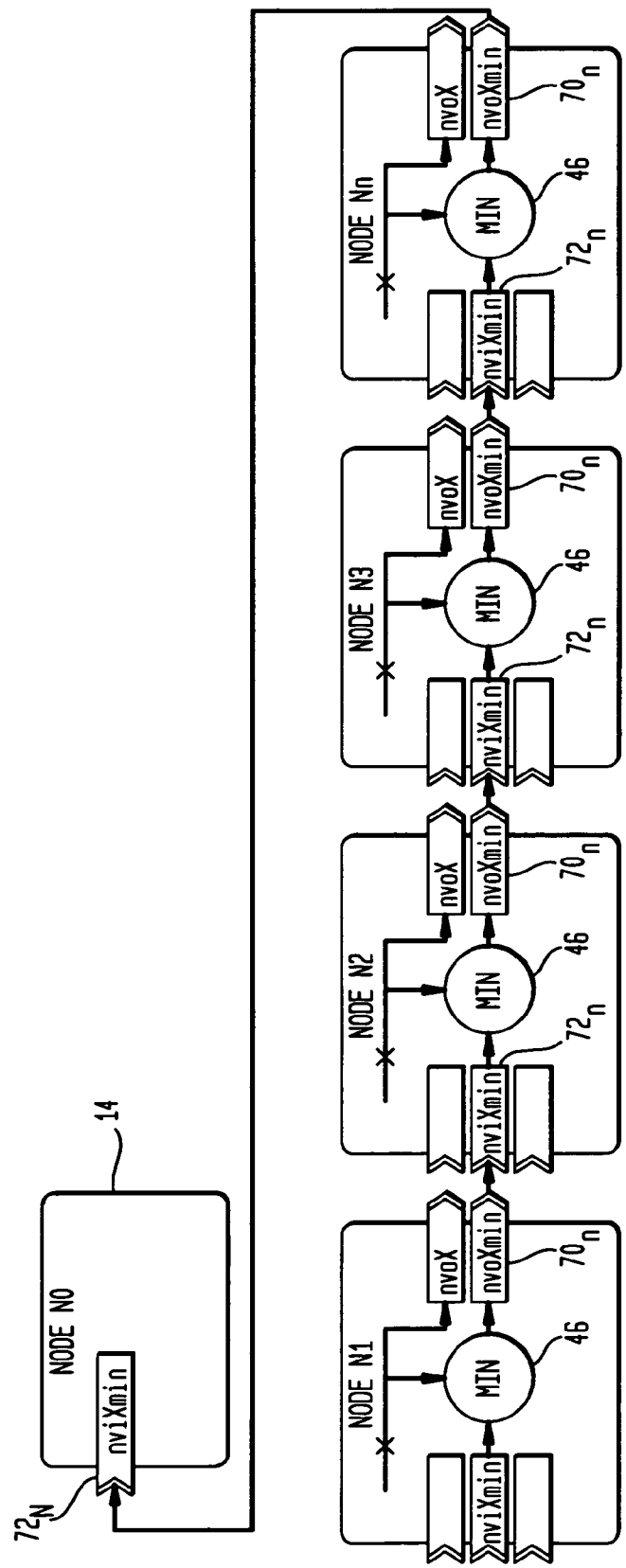
FIG. 5 shows an alternative coupling of VAV controllers to an AHU controller done in accordance with the principles of the present invention.

An alternative coupling of controllers $18_1 \ldots 18_n$ to AHU controller 14 is shown in FIG. 5. In this arrangement, a network variable output $70_n$ is coupled to the network variable input $72_n$ of another controller. Task 46 of the sink controller responding to the nv_update_occurs event for the network variable input in this one-to-one coupling, computes an aggregate or selection value from the update value received for the network variable and a local value. The controller may then provide the computed value as an update value on one of its network variable outputs to another controller. This serial operation may continue until the last of the controllers $18_1 \ldots 18_n$ provides a value that corresponds to a value obtained from an update value from all of the controllers $18_1 \ldots 18_n$ to AHU controller 14. However, this arrangement is limited to functions that do not rely on identification of a particular source controller to be meaningful. A sum is such a computation because the sum does not originate from a particular controller but a value from each controller contributes to the calculation of the sum. If the identification of a selection value, such as the minimum, is only useful because the particular local space where the minimum value occurred is known, then this configuration is not preferred because the update value may propagate through the controllers without reference to one particular controller. That is, the network address refers to the source controller that provided the update value but the update value may have originated from a previous controller in the chain. On the other hand, if a task simply requires a value for a plurality of controllers without reference to the identity of the controller that supplied the update value, then this configuration may be used. For example, if a task at AHU controller 14 requires data identifying a minimum value from the plurality of controllers coupled to it and data identifying the source of that minimum value to determine a control action, the chain configuration is not adequate. On the other hand, if the task at AHU controller 14 only requires data identifying a minimum value among the update values available from the plurality of controllers, then the chain configuration may be used. To reduce the likelihood of erroneous association of an update value with the controller that simply passed it along, the coupling arrangement of FIG. 5 should be limited to functions that compute a value to which each controller contributes a datum or to functions that do not need to distinguish the source of the data in order to properly determine a control action or status.

Figure 6:
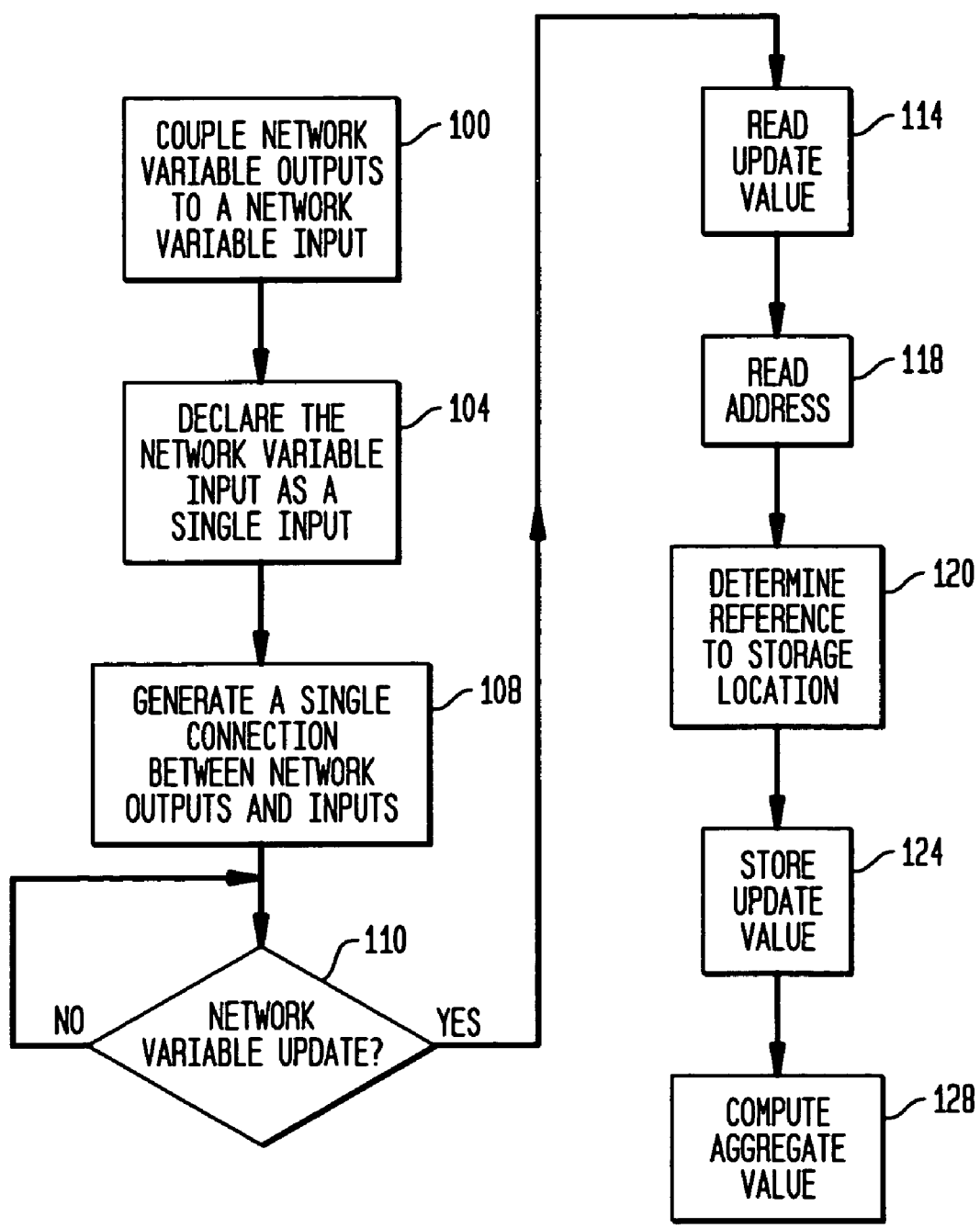
FIG. 6 is a flowchart of an exemplary method that may be used to implement the principles of the present invention.

An exemplary method of the present invention is shown in FIG. 6. The method begins by coupling a plurality of source controller network variable outputs to a network variable input at a sink controller (block 100). The network variable input is declared a single input (block 104) and a single connection is generated for the plurality of network variable outputs and the network variable input (block 108). This configuration permits each source controller to provide update values to the network variable associated with the network variable input. At the occurrence of an nv_update_occurs event (block 110), the update value is read (block 114) and the source controller network address is read (block 118). The contents of the network variable input address are used to determine a reference for a location in a data structure in which the update value may be stored (block 120). The update value is stored in that location (block 124) and an aggregate value for a control variable may be computed (block 128) from the update values stored in the data structure. The values stored in the data structure may be initialized upon initiation of the program that controls the sink controller to prevent the computation of aggregate values at system initialization from producing results that adversely impact the operation of system 10.

The value computation may include operating on the stored update values to identify a minimum value, a maximum value, or median average value from the update values. Alternatively, the aggregate value computation may include operating on the stored update values to compute a mean average, a standard deviation, variance, sum, or product from the stored update values, for example. The method may also include updating the network variable with real number data or discrete level dat. Real number data may include temperature, pressure, flow rate, humidity, water content, damper position, or valve position data, for example. Discrete level data, for example, may include switch position, actuator status, device status, occupancy mode, or operating mode data.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An automation control system comprising:
   a sink controller having a network variable input;
   a plurality of source controllers, at least two of which have a network variable output coupled to the network variable input of the sink controller to provide an update value to the network variable input; and
   a data structure in the sink controller for storing update values received from the network variable outputs of the source controllers that are coupled to the network variable input so the update values for each source controller are persistently stored in the sink controller with reference to the source controller that provided the update value.

2. The system of claim 1 further comprising:
   a function that operates on the stored update values to generate an aggregate value.

3. The system of claim 2 wherein the function is one of a sum, product, standard deviation, variance, or mean average function.

4. The system of claim 1 further comprising:
   a function that operates on the stored update values to select a value.

5. The system of claim 4 wherein the function is one of a minimum, maximum, or median average function.

6. The system of claim 1 wherein the network variable inputs provide real number data for the update values.

7. The system of claim 6 wherein the real number data represents one of temperature, pressure, flow rate, humidity, water content, damper position, or valve position data.

8. The system of claim 1 wherein the network variable inputs provide discrete level data for the update values.

9. The system of claim 8 wherein the discrete level data represents one of switch position, actuator status, device status, occupancy mode, or operating mode data.

10. The system of claim 1 wherein the data structure is a table.

11. The system of claim 1 wherein the data structure is an array.

12. A method for operating a environmental control system comprising:
    coupling a plurality of source controller network variable outputs to a network variable input at a sink controller so each source controller may provide update values to the network variable input; and
    storing the update value received at the network variable input in a data structure at the sink controller.

13. The method of claim 12 wherein the update value storage may also include identifying a storage location corresponding to a source controller address.

14. The method of claim 13 wherein the storage location identification identifies a location in a table.

15. The method of claim 14 wherein the storage location identification identifies a location in an array.

16. The method of claim 12 further comprising:
    operating on the stored update values to select one of the stored update values.

17. The method of claim 16 wherein the selection selects one of a minimum, maximum, or median average of the stored update values.

18. The method of claim 12 further comprising:
    operating on the stored update values to compute an aggregate value.

19. The method of claim 18 wherein the aggregate value computation is one of a sum, product, standard deviation, variance, or mean average of the stored update values.

20. The method of claim 12 further comprising:
updating the network variable input with real number data.

21. The method of claim 20 wherein the real number data updating includes updating the network variable input with one of temperature, pressure, humidity, flow rate, water content, damper position, or valve position data.

22. The method of claim 12 further comprising:
updating the network variable input with discrete level data.

23. The method of claim 20 wherein the discrete level data updating includes updating the network variable input with one of switch position, actuator status, occupancy mode, or operating mode data.

24. An automation control system comprising:
a source controller having a network variable output for providing an update value;
a first sink controller having a network variable input for receiving the update value from the network variable output of the source controller, a function for operating on the update value and a local value, and also having a network variable output for providing an update value corresponding to the operation of the function; and
a second sink controller having a network variable input coupled to the network variable output of the first sink controller whereby the second sink controller receives the update value corresponding to the output of the function of the first sink controller on a single network variable input.

25. A method for controlling a system having controllers comprising:
providing an update value on a network variable output of a first controller;
receiving the update value on the network variable input of a second controller;
operating on the update value and a local value at the second controller;
providing on a network variable output of the second controller an update value corresponding to the operation of the function; and
receiving the update value on a network variable input of a third controller, the received update value corresponding to the operation of the function at the second controller whereby the receipt of the update value at the third controller corresponding to data at the first and second controllers occurs at a single network variable input.

* * * * *